Patented Dec. 19, 1933

1,940,495

UNITED STATES PATENT OFFICE 1,940,495

PROCESS OF PRODUCING PHENOLPHTHALEIN

Max H. Hubacher, Nitro, W. Va., assignor to Kavalco Products, Inc., Nitro, W. Va., a corporation of West Virginia No Drawing. Application October 21, 1930
Serial No. 490,323

34 Claims. (Cl. 260—65)

The present invention relates to phenolphthalein and processes of making same.

An object of the present invention is to produce a phenolphthalein similar in character to the material generally known as yellow phenolphthalein, but relatively purer, lighter and more uniform in color as compared with the usual grade of yellow phenolphthalein; also a white phenolphthalein possessing a high grade of purity and meeting the requirements of the U. S. Pharmacopoeia.

Another object of this invention is to produce either white or yellow phenolphthalein in a finely divided form.

Still another object of the invention is to provide suitable processes for the commercial manufacture of phenolphthalein having the characteristics mentioned, which are simple, economical and easy to carry out on a large scale of production.

Crude phenolphthalein produced by the well-known reaction of phthalic anhydride with phenol in the presence of a condensing agent, such as anhydrous zinc chloride or sulphuric acid, after removal of the water soluble constituents by washing, is a dark yellow to brown crystalline material containing as impurities varying amounts of tarry or resinous by-products which are responsible for its color, and also containing greater or less amounts of other by-products such as fluorane.

A process commonly used for removing the impurities from the crude material has been to dissolve the latter, after it has been washed with water, in an alkaline solution, such as a solution of sodium hydroxide, filter the solution to remove fluorane, and subsequently precipitate the phenolphthalein by an acid. The resulting material, after being washed and dried, is a partially purified product generally known as yellow phenolphthalein. For producing a white material or one meeting the requirements of the U. S. Pharmacopoeia, the material resulting from the partial purification mentioned is then further treated to free it of tarry substances by dissolving it in alcohol or other organic solvent, using a decolorizing carbon in the solution, and boiling and filtering the solution, concentrating it and then crystallizing out the phenolphthalein by cooling. The phenolphthalein obtained from this crystallization is then similarly retreated to produce a crystallized phenolphthalein, and this is repeated as often as is necessary and usually many times to produce a product of the required purity.

A serious disadvantage of this process of purification is the ineffectiveness of a single crystallizing operation or a few crystallizing operations to produce a product which is sufficiently white in color and sufficiently free from resinous bodies and which possesses a sufficiently high melting point to attain the required standard; so that increased labor and considerable loss of time and material are caused by the large number of purifications necessary to produce an acceptable product. Other disadvantages will become apparent from the following description.

Applicant has discovered that a considerable amount of colored products are formed in phenolphthalein as a result of the aforesaid method of treating the crude phenolphthalein with an alkaline solution for subsequent removal of fluorane, and it is believed that they are formed by oxidation during the time the phenolphthalein is in solution as an alkali metal salt. If the procedure of dissolving crude phenolphthalein in, for example, a solution of sodium hydroxide, filtering the solution to remove fluorane and precipitating phenolphthalein from the solution by an acid, is carried out in a few minutes, the resulting product may have a light yellow color and the filtrate may be colorless. If, however, considerable time is allowed to elapse between the steps of dissolving and precipitating, as made necessary in plant operation for production on a large scale, the resulting product is decidedly darker in color, and the aqueous filtrate is yellow or brown, due to the presence of water-soluble products formed in the red solution of the alkali-metal salt of phenolphthalein before precipitation.

If pure white phenolphthalein is dissolved in a sodium hydroxide solution and the resulting solution is allowed to stand exposed to air for several hours, the solution undergoes a change just as does a solution of yellow phenolphthalein in an alkali: upon precipitation by an acid, the resulting phenolphthalein is no longer pure and white, but has changed in color to a brown or gray.

The amount of discoloration of phenolphthalein depends upon the time the solution of the alkali metal salt of phenolphthalein is exposed to the air or the amount of aeration that it has received. That this discoloration of the product is due to the action of air or, more specifically, to the action of oxygen of the air, was made apparent by the following experiment:

80 grams of crude yellow phenolphthalein were dissolved in 1600 cc. of a 1.4% (by volume) solution of sodium hydroxide, and the latter filtered. The filtered solution was then divided into two equal parts. Through one of these solutions air was bubbled slowly for 19 hours, and the other was treated in a similar way and at the same temperature with natural gas which had been first washed with an alkaline solution of pyrogallol to remove any oxygen that might be present. Upon precipitation from the treated solutions, it was found that the phenolphthalein sample resulting from the solution which had been treated with air was much darker in color than the phenolphthalein sample resulting from the solution treated with natural gas.

Applicant has also discovered that certain substances, when added to a solution of an alkali metal salt of phenolphthalein, greatly retard or inhibit the action of oxygen, so that the resulting solution may be exposed to the air or stored for longer periods of time than have heretofore been possible without undergoing substantially any change or deterioration. These oxidation-preventing substances or anti-oxidants are substances which are themselves capable of oxidation by taking up oxygen or capable of being decomposed by oxidation, and come under the classification of reducing agents. It is noted that the reducing agent used should not be such that it will cause any detrimental action on phenolphthalein. For example, sodium thiosulphate inhibits the oxidation of an alkali metal salt of phenolphthalein, but upon treatment of the solution of the alkali metal salt of phenolphthalein with an acid to precipitate phenolphthalein, sulphur is liberated and contaminates the phenolphthalein. In this case it would be necessary to remove the free sulphur before the phenolphthalein could be used as a commercial product.

Sodium sulphite is an excellent substance to be used as a reducing agent in a solution of an alkali metal salt of phenolphthalein. The beneficial effect of this substance was proved by the following experiment:

100 grams of crude yellow phenolphthalein was dissolved in two litres of a 1.4% (by volume) solution of sodium hydroxide and the solution was stirred for twenty-four hours while exposed to the air. Phenolphthalein was then precipitated by slowly adding the solution, maintained at 25° C., during approximately 1 hour's time, and with stirring, to 350 cc. of a diluted sulphuric acid solution containing a slight excess of sulphuric acid over the calculated amount necessary to neutralize the sodium hydroxide used to dissolve the original material. The resulting precipitated phenolphthalein was dark in color, and a 1% solution in alcohol was dark brown.

Another sample was obtained conjointly with the material described in a similar way, using the same amount of the same crude yellow phenolphthalein and the same amount and concentration of sodium hydroxide solution, but by first incorporating 10 grams of sodium sulphite in the sodium hydroxide solution before the addition of the crude phenolphthalein; the resulting solution was subjected to the same conditions of stirring and time of exposure, and the precipitation of phenolphthalein was carried out under the same conditions of time and temperature. This sample showed practically no discoloration, and a 1% alcohol solution was light yellow in color, in contrast to the brown color observed when no sodium sulphite was used.

It has also been observed that one may dissolve pure white phenolphthalein in an alkaline solution containing a suitable quantity of a reducing agent such as sodium sulphite, and the resulting solution, even if exposed to air for a considerable length of time, will, when acidified, yield after suitable washing and drying a material as white and pure as the original phenolphthalein started with. As has already been explained, if pure white phenolphthalein be dissolved in an alkali and the resulting solution be exposed to air (without treatment with an oxidation preventive), the color and purity of the final material are impaired, and if such a solution is exposed to air for any considerable length of time, the effect of oxidation becomes quite noticeable.

The amount of the substance used as a reducing agent in a solution of an alkali metal salt of phenolphthalein to prevent oxidation depends upon the amount of aeration to which this solution is subjected. For example, when a solution of sodium salt of phenolphthalein prepared by dissolving 100 grams of crude yellow phenolphthalein in two litres of a 1.4% (by volume) solution of sodium hydroxide, was exposed to the air with stirring for ten hours, it was found that five grams of anhydrous sodium sulphite in this solution was sufficient to prevent deterioration of the phenolphthalein.

In plant operation, it has been determined that not more than 5% of anhydrous sodium sulphite, based on the weight of phenolphthalein used, when added to the alkaline solution before the addition of the crude phenolphthalein, will in general successfully prevent deterioration of the solution by oxidation.

Instead of using anhydrous sodium sulphite as the reducing agent, hydrated crystals of sodium sulphite, or sodium bisulphite or sodium metabisulphite may be used. In addition, other compounds have been found to prevent the oxidation of an alkali metal salt of phenolphthalein in aqueous solution. For example, such compounds as sodium hydrosulphite, stannous chloride, manganese sulphate, ferrous sulphate, ferrous ammonium sulphate, cuprous chloride, etc., have been successfully used for this purpose. Also, instead of the sulphites of sodium, one may use sulphites of other alkali metals, such as ammonium sulphite, magnesium sulphite, etc., and also other hydrosulphites. It becomes apparent that other salts than the ones mentioned may be used. For example, ferrous acetate, ferrous chloride, ferrous bromide, etc., serve the same purpose as ferrous sulphate. Also, sulphoxylates may be used. Briefly, any substance may be used which, when introduced in a solution of an alkali metal salt of phenolphthalein, prevents objectionable deterioration or decomposition of the latter salt and objectionable contamination or discoloration of the phenolphthalein resulting from precipitation.

Modifications of this method of preventing discoloration of phenolphthalein become apparent. An excess of sodium hydroxide may be used to dissolve the phenolphthalein, and sulphur dioxide may be passed into the solution to form the required amount of sodium sulphite to prevent oxidation. Also, a solution of an alkali metal salt of phenolphthalein, if maintained in a reducing atmosphere, or maintained in or treated with a non-oxidizing gas, will also be guarded against deterioration by oxidation.

Experiments were carried out to determine the oxidizing effect of temperature on a solution of an alkali metal salt of phenolphthalein containing an adequate amount of sodium sulphite or other reducing agent. These experiments revealed that a temperature of about 15° C. was satisfactory for maximum efficiency in preventing oxidation, but that good results could be obtained with temperatures up to 100° C. Temperatures below 15° C., which could be obtained by adding ice to the aqueous solution, did not improve the results materially. In plant operation, however, a solution of an alkali metal salt of phenolphthalein containing an adequate amount of a reducing agent is preferably maintained at a temperature not exceeding 35° C., this procedure having been found convenient and satisfactory in effectively preventing oxidation of said alkali metal salt of phenolphthalein. It is understood, however, that the sodium sulphite or other suitable reducing agent in the solution of an alkali metal salt of phenolphthalein functions as an antioxidant under a large range of temperature of this solution.

A well-known method for producing a finely divided phenolphthalein material, either white or yellow, has been to dissolve the product after purification in an organic solvent such as alcohol and add water to the solution until precipitation of phenolphthalein is complete. This method has the disadvantage that it entails the recovery of the organic solvent to make it economically possible; also is is difficult to perform in that, if conditions governing the precipitation are not just right, the phenolphthalein is apt to precipitate as a dough or paste instead of as a crystalline material, so that close supervision is necessary.

Applicant has determined that the fineness of division of phenolphthalein obtained by precipitation by an acid from a solution of an alkali metal salt of phenolphthalein, is governed or controlled by the temperature of the reaction mixture during precipitation. If phenolphthalein is precipitated from a solution of an alkali metal salt of phenolphthalein at temperatures higher than 15° C., the precipitated material is coarse and dense, whereas if this precipitation is performed at temperatures of 15° C. or lower, a more fluffy and more finely divided material is obtained. In order to obtain a phenolphthalein having a low apparent density of about 0.5, the red solution should be cooled before precipitation and maintained cold during precipitation, and the temperature during precipitation should not be above 15° C., but, preferably, it should be between 5° C. and 15° C., as, for example, 10° C.

If a finely divided phenolphthalein is desired, this material may be obtained by carrying out as a last step in its manufacture the procedure of dissolving the phenolphthalein in an alkaline solution and precipitating the phenolphthalein by an acid, the temperature during precipitation being maintained at a suitably low value. This method of obtaining a finely divided phenolphthalein does not involve the recovery of an organic solvent which is a requirement of the method used at present, as stated heretofore, and involves no difficulties in its performance; and the material obtained is much finer than one obtained by grinding a phenolphthalein crystallized from an organic solvent.

Important advantages which the present invention brings about will now be understood. By preventing the formation of oxidation products while processing impure phenolphthalein, obtained by condensation of phthalic anhydride with phenol, to free it of fluorane bodies, and by proper control of the temperature during precipitation of the product from the red solution of the alkali salt of phenolphthalein, it has been found possible to produce directly a finely divided light yellow phenolphthalein and one which is much purer and lighter in color than has been heretofore obtainable. It should be observed that with the present method of producing yellow phenolphthalein, the unavoidable delays in plant operation permit the aqueous solution of the alkali metal salt of phenolphthalein to remain in contact with air for varying periods of time, thereby causing a variation in the color of the finished product. Thus, still another improvement brought about by the present invention is the uniformity of color of the improved yellow phenolphthalein. Other advantages of this improved material will be stated hereinafter.

When it is intended to use yellow phenolphthalein in tablets or candy, an extremely finely divided material is not necessary. In such cases, the control of the temperature during precipitation of the product from the red solution of the alkali salt of phenolphthalein may be omitted, and a satisfactory coarser product may thus be obtained, any convenient temperature during precipitation being employed and the precipitated product being of equal purity to the finely divided material precipitated with control of temperature.

Another important advantage of the present invention is the simplicity of its process of producing a finely divided white phenolphthalein. By preventing objectionable oxidation of the alkali metal salt of phenolphthalein in aqueous solution, it has been found possible to reverse the sequence of steps heretofore used for purifying crude phenolphthalein which has been obtained by condensation of phthalic anhydride with phenol, this heretofore used sequence being (1) processing to remove fluorane bodies and (2) processing the resulting material to remove tarry bodies. According to this invention the sequence of steps is (1) processing the material to remove tarry bodies and (2) processing the resulting material to remove fluorane bodies. With this sequence of steps and proper control of temperature during precipitation of phenolphthalein, the desired finely divided and purified material is obtained without any further treatment. In other words, crude phenolphthalein resulting from the condensation of phthalic anhydride with phenol, after being washed free of water-soluble matter, is directly treated to remove tarry substances formed by the reaction of condensation in the well-known manner of crystallization from an organic solvent as heretofore outlined. If a white phenolphthalein meeting the requirements of the U. S. Pharmacopoeia is desired, the phenolphthalein obtained from this crystallization is then crystallized a second time, the resulting product being substantially white in color, but still containing fluorane by-products as impurities. This product is then processed to remove fluorane bodies, as hereinbefore stated, using a reducing agent such as sodium sulphite in the aqueous solution of the alkali metal salt of phenolphthalein. The phenolphthalein is then precipitated by an acid from the latter solution, with control of temperature is hereinbefore stated, and after being washed and dried, is a finely divided material, substantially white in color and meeting the requirements of the United States Pharmacopoeia. In addition to providing directly the material in a finely divided form, this improved process of producing a purified phenolphthalein, if a U. S. P. material is desired, involves only two crystallizing operations, so that a considerable saving in time, labor, and material is effected; also, the aqueous solution of the alkali metal salt of phenolphthalein is much easier to handle in regard to recovery of the phenolphthalein.

The sequence of steps employed for producing pure white phenolphthalein, as outlined above, is also advantageous when omitting the control of temperature during precipitation of the product from the solution of the alkali salt of phenolphthalein. This control of temperature during precipitation is useful in that an extremely finely divided material is obtained. In cases, however, where fineness of division of pure white phenolphthalein is not important, this control of temperature may be omitted, but even up to a temperature of 100° C. during precipitation, a pure white phenolphthalein is obtained which is as finely divided as one obtained by grinding a phenolphthalein crystallized from an organic solvent.

A detailed procedure which has been carried out to produce the finely divided light yellow phenolphthalein of the present invention is the following:

Crude phenolphthalein was used which had been obtained by the condensation of phthalic anhydride with phenol in the presence of a suitable condensing agent by the procedure disclosed and claimed in a copending application of the present applicant, Serial No. 473,765, filed August 7, 1930. This procedure was as follows: phthalic anhydride was condensed with phenol in the presence of anhydrous zinc chloride, a relatively small amount of concentrated sulphuric acid and a suitable quantity of a good decolorizing carbon. The following proportions of ingredients were used: 376 pounds of phenol, 296 pounds of phthalic anhydride, 200 pounds of anhydrous zinc chloride, 20 pounds of sulphuric acid (66° Bé.) and 20 pounds of decolorizing carbon. Since the charge had a tendency to become viscous when nearing the end of the reaction of condensation, this stiffening of the condensate was counteracted by adding to the charge a suitable quantity of a liquefying agent, such as chlorbenzene, tetrachlorethane, or a petroleum oil. The ingredients were charged into a suitable non-ferrous container, such as a steel-jacketed glass-enamelled kettle, and heated therein with agitation at about 120° C. for about thirteen hours. When the condensation was finished, the liquefying agent was removed from the condensate by steam distillation or extraction by means of a solvent such as petroleum ether in which phenolphthalein is not appreciably soluble. The product of the condensation was made into a slurry by adding hot water. This slurry was then run into a tub, and the condensate well washed with hot water until water-soluble matter, such as zinc chloride, phenol and phthalic acid, had been removed. The condensate was then ready for purification.

The crude product thus obtained was then treated for extraction of phenolphthalein by adding it to a solution of sodium hydroxide containing anhydrous sodium sulphite, and for this extraction the following proportions of ingredients were used: 2 litres of a 1.4% (by volume) solution of sodium hydroxide per 100 grams of the crude phenolphthalein, and 5% of anhydrous sodium sulphite, based on the weight of phenolphthalein used. The mixture was maintained at a temperature not exceeding 35° C. The solution, red in color, was then filtered, and the filter cake washed. This filter cake contained substantially all of the fluorane bodies originally present in the crude material and substantially all of the carbon black which was previously added to the condensation charge. The filtrate was then run into such an amount of a diluted sulphuric acid solution as to effect precipitation of the phenolphthalein, the temperature during precipitation being maintained below 15° C. and preferably around 10° C. The precipitated material was filtered, washed thoroughly and dried. The dried material was subjected to grinding, but merely for the purpose of separating those already fine particles present in loosely agglomerated form.

A detailed procedure which has been carried out to produce finely divided, pure white phenolphthalein, is the following:

Crude phenolphthalein was prepared as outlined above. The crude product, freed of water-soluble matter, was dried and then dissolved in ethyl alcohol in the proportion of 100 grams to 600 c.c. of solvent; a good decolorizing carbon was added to the solution in the proportion of 4 grams per 100 grams of phenolphthalein. The solution was refluxed under boiling for one hour, and then filtered and the filtrate concentrated by boiling off two-thirds of the alcohol. On cooling, phenolphthalein crystallized out from the solution. The sludge was centrifuged and washed with alcohol. The material was then recrystallized in the same manner and then dried. It was then processed to free it of fluorane bodies in the same manner as previously described in the detailed procedure for producing the yellow material, the solution of the sodium salt of phenolphthalein being treated with an oxidation preventive and the temperature during precipitation of phenolphthalein from this solution being maintained at a suitably low value.

It is understood that in either of the two detailed procedures given above for producing yellow phenolphthalein and pure white phenolphthalein, it is not necessary to control temperature during precipitation of phenolphthalein from the solution of the alkali metal salt of phenolphthalein, if fineness of division of the resulting phenolphthalein is not required.

The improved yellow phenolphthalein produced by the method hereinbefore described, was light yellow in color due to the presence of substituted anthraquinones, etc., and was substantially free from dark bodies or oxidation products. These oxidation products are believed to be responsible for the frequent bitter taste of chocolate when ordinary yellow phenolphthalein is made into a chocolate laxative. Also, they are the probable cause of distress or griping at times complained of when ordinary yellow phenolphthalein is employed as a laxative. Thus, the improved yellow phenolphthalein of this invention does not cause chocolate to become bitter and griping trouble appears to be eliminated.

It is to be understood that the detailed procedures described are subject to various modifications without departing from the principle of the invention.

What is claimed is:

1. In a process of producing phenolphthalein, treating an alkali metal salt of phenolphthalein with an oxidation preventive.

2. The method of preventing discoloration of phenolphthalein obtained by precipitation from an aqueous solution of an alkali metal salt of phenolphthalein, comprising treating said alkali metal salt of phenolphthalein with an oxidation preventive before precipitation of phenolphthalein.

3. The method of preventing the deterioration of an alkali metal salt of phenolphthalein in aqueous solution, comprising treating the solution with a suitable anti-oxidant.

4. The method of preventing the deterioration of an alkali metal salt of phenolphthalein in aqueous solution, comprising treating the solution with sodium sulphite.

5. The method of preventing deterioration of an alkali metal salt of phenolphthalein in aqueous solution, comprising maintaining the solution under non-oxidizing conditions.

6. In a process of producing phenolphthalein, the steps of adding a suitable anti-oxidant and phenolphthalein to an alkaline solution, the resulting solution being maintained at a temperature of not over 35° C., and precipitating phenolphthalein from said resulting solution.

7. In a process of producing phenolphthalein, the steps of adding sodium sulphite and phenolphthalein to an alkaline solution, the resulting solution being maintained at a temperature of not over 35° C., and precipitating phenolphthalein from said resulting solution.

8. In a process of producing phenolphthalein, the following steps performed in their order of sequence: (1) adding a suitable anti-oxidant to an alkaline solution; (2) dissolving phenolphthalein therein; (3) precipitating phenolphthalein from the resulting material.

9. In a process of producing phenolphthalein, the following steps performed in their order of sequence: (1) adding sodium sulphite to an alkaline solution; (2) dissolving phenolphthalein therein; (3) precipitating phenolphthalein from the resulting material.

10. In a process of producing phenolphthalein, adding phenolphthalein to an alkaline solution to which is added sodium sulphite in the proportion of approximately 5% of the phenolphthalein, and precipitating phenolphthalein from the resulting material.

11. In a process of producing yellow phenolphthalein from crude phenolphthalein which has been obtained by condensation of phthalic anhydride with phenol: treating said crude phenolphthalein with an alkaline solution and with an oxidation preventive and filtering to remove fluorane bodies and precipitating the desired material from the filtrate; and separating the precipitate.

12. In a process of producing a finely divided yellow phenolphthalein from crude phenolphthalein which has been obtained by condensation of phthalic anhydride with phenol; treating said crude phenolphthalein with an alkaline solution and with an oxidation preventive and filtering to remove fluorane bodies and precipitating the desired material from the filtrate while maintaining a low temperature, and separating the precipitate.

13. In a process of producing phenolphthalein from crude phenolphthalein which has been obtained by condensation of phthalic anhydride with phenol, the following steps performed in their order of sequence; (1) processing said crude phenolphthalein to remove tarry substances; (2) processing the resulting material to remove fluorane bodies by treating with an alkaline solution and with an oxidation preventive, and filtering; and (3) precipitating phenolphthalein from the filtrate, and separating the precipitate.

14. In a process of producing a finely divided phenolphthalein from crude phenolphthalein which has been obtained by condensation of phthalic anhydride with phenol, the following steps performed in their order of sequence: (1) processing said crude phenolphthalein to remove tarry substances; (2) processing the resulting material to remove fluorane bodies by treating with an alkaline solution and with an oxidation preventive, and filtering; and (3) precipitating phenolphthalein from the filtrate while maintaining a low temperature, and separating the precipitate.

15. In a process of producing a finely divided yellow phenolphthalein, adding to an alkaline solution a suitable anti-oxidant and crude phenolphthalein which has been obtained by condensation of phthalic anhydride with phenol; filtering the resulting solution to remove fluorane bodies; precipitating phenolphthalein from the filtrate while maintaining a low temperature, and separating the precipitate.

16. In a process of producing a finely divided yellow phenolphthalein from crude phenolphthalein which has been obtained by condensation of phthalic anhydride with phenol; treating said crude phenolphthalein with an alkaline solution to which sodium sulphite is added, and filtering the resulting solution, the amount of sodium sulphite being approximately 5% by weight of the crude phenolphthalein used and the resulting solution being maintained at a temperature of not over 35° C.; and precipitating phenolphthalein from the filtrate while maintaining a temperature during precipitation not exceeding 15° C., and separating the precipitate.

17. In a process of producing a finely divided substantially pure phenolphthalein from crude phenolphthalein which has been obtained by condensation of phthalic anhydride with phenol, the following steps performed in their order of sequence: (1) processing said crude phenolphthalein to remove tarry substances; (2) treating the resulting material with an alkaline solution to which a suitable anti-oxidant is added; (3) filtering the resulting solution; (4) precipitating phenolphthalein from the filtrate while maintaining a low temperature.

18. In a process of producing a finely divided phenolphthalein substantially purified of impurities from crude phenolphthalein which has been obtained by condensation of phthalic anhydride with phenol, the following steps performed in their order to sequence: (1) processing said crude phenolphthalein to remove tarry substances; (2) treating the resulting material with an alkaline solution to which is added 5% of sodium sulphite based on the weight of phenolphthalein; (3) filtering the resulting solution; (4) precipitating phenolphthalein from the filtrate while maintaining a temperature not exceeding 35° C. before precipitation and not exceeding 15° C. during precipitation.

19. A light yellow phenolphthalein free of fluorane bodies and bodies normally formed by oxidation of an alkali metal salt of phenolphthalein.

20. A finely divided light yellow phenolphthalein free of fluorane bodies and bodies normally formed by oxidation of an alkali metal salt of phenolphthalein.

21. In a process of producing phenolphthalein, the step of treating an alkali metal salt of phenolphthalein to prevent oxidation of such salt.

22. A method of the character described, comprising treating an aqueous solution of an alkali metal salt of phenolphthalein under such conditions as to prevent oxidation of the alkali metal salt.

23. A method of preventing deterioration of an alkali metal salt of phenolphthalein in aqueous solution, which comprises, maintaining the solution in the presence of an oxidation inhibitor.

24. In a process of producing phenolphthalein, the steps of maintaining an alkaline solution of phenolphthalein under non-oxidizing conditions and at a temperature of not over 35° C. and precipitating phenolphthalein from the solution.

25. In a process of producing phenolphthalein, the steps of maintaining an alkaline solution of phenolphthalein in the presence of an oxidation inhibiting fluid, the solution being maintained at a temperature of not over 35° C. and precipitating phenolphthalein from the solution.

26. In a process of producing phenolphthalein, the step of treating an alkali metal salt of phenolphthalein with an agent which oxidizes more readily than such alkali metal salt so as to substantially prevent the oxidation of such alkali metal salt before precipitating phenolphthalein therefrom.

27. A process of producing phenolphthalein, which comprises, adding phenolphthalein and a suitable anti-oxidant to an alkaline solution, the anti-oxidant being one which does not contaminate or discolor the final product resulting from precipitation, and precipitating phenolphthalein therefrom.

28. A process of producing phenolphthalein, which comprises, adding phenolphthalein, and a suitable anti-oxidant to an alkaline solution, the anti-oxidant being one which oxidizes more readily than the alkali metal salt of phenolphthalein but which has no reducing effect on the phenolphthalein or other compounds contained in the mixture.

29. A process of the character described, which comprises, adding phenolphthalein and a suitable anti-oxidant to an alkaline solution, the anti-oxidant being one which oxidizes more readily than phenolphthalein but which does not have any appreciable reducing action on the phenolphthalein or other compounds in the mixture, and precipitating phenolphthalein from the resulting mixture to obtain a yellow phenolphthalein product without an alcohol crystallization.

30. A light yellow phenolphthalein free of fluorane compounds and free of compounds normally formed by the oxidation of an alkali metal salt of phenolphthalein, the yellow phenolphthalein being produced without an alcohol crystallization.

31. A light yellow phenolphthalein product substantially free of fluorane bodies and bodies formed by oxidation of an alkali metal salt of phenolphthalein, the phenolphthalein having a melting point about 256° C. but below the melting point of chemically pure phenolphthalein.

32. The method of preventing the deterioration of an alkali metal salt of phenolphthalein in aqueous solution which comprises, treating the solution with sodium meta-bisulphite.

33. In a process of producing phenolphthalein, the steps of adding sodium meta-bisulphite and phenolphthalein to an alkaline solution, the resulting solution being maintained at a temperature of not over substantially 35° C., and precipitating phenolphthalein from such resulting solution.

34. In a process of producing phenolphthalein, the step of treating an alkali metal salt of phenolphthalein with sodium meta-bisulphite to prevent oxidation of such salt.

MAX H. HUBACHER.